(12) United States Patent
Mishra et al.

(10) Patent No.: US 11,900,091 B2
(45) Date of Patent: Feb. 13, 2024

(54) EXTENSIBLE UPGRADE AND MODIFICATION AS A SERVICE

(71) Applicant: Dell Products L.P., Round Rock, TX (US)

(72) Inventors: Nilay Mishra, Bangalore (IN); Farook Shaik, Hyderabad (IN); Reshma Nair, Bangalore (IN); Gaurav Suwal, Bhaktapur (IN); Vishnu Prabhu Sundarrajan, Coimbatore (IN); Manikandan Pammal Rathinavelu, Cedar Park, TX (US); Bala Kumar, Bangalore (IN); Narendra Kumar, Ongole (IN); Hung T. Dinh, Austin, TX (US); Vijaya P. Sekhar, Bangalore (IN); Abhijit Mishra, Bangalore (IN); Satish Ranjan Das, Round Rock, TX (US); Krishna Mohan Akkinapalli, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 86 days.

(21) Appl. No.: 17/146,817

(22) Filed: Jan. 12, 2021

(65) Prior Publication Data

US 2022/0222053 A1  Jul. 14, 2022

(51) Int. Cl.
*G06F 8/65* (2018.01)
*G06F 9/451* (2018.01)
(Continued)

(52) U.S. Cl.
CPC ............ *G06F 8/65* (2013.01); *G06F 8/36* (2013.01); *G06F 8/61* (2013.01); *G06F 8/76* (2013.01); *G06F 9/451* (2018.02)

(58) Field of Classification Search
CPC ..... G06F 8/65; G06F 8/36; G06F 8/61; G06F 9/451; G06F 8/76
See application file for complete search history.

(56) References Cited

U.S. PATENT DOCUMENTS

| 7,698,398 B1 * | 4/2010 | Lai ................... G06Q 30/00 709/228 |
| 8,600,925 B2 | 12/2013 | Vickers et al. |

(Continued)

OTHER PUBLICATIONS

Gannod, Gerald C., Sudhakiran V. Mudiam, and Timothy E. Lindquist. "An architecture-based approach for synthesizing and integrating adapters for legacy software." Proceedings Seventh Working Conference on Reverse Engineering. IEEE, 2000. (Year: 2000).*

(Continued)

*Primary Examiner* — Kevin L Young
*Assistant Examiner* — Joanne G Macasiano
(74) *Attorney, Agent, or Firm* — Ryan, Mason & Lewis, LLP

(57) ABSTRACT

Methods, apparatus, and processor-readable storage media for implementing extensible upgrade and modification as a service are provided herein. An example computer-implemented method includes processing one or more modifiers, wherein each modifier includes an independent processing unit having a given canonical structure and is configured to execute one or more automated actions related to at least one of application modification and application migration; obtaining data pertaining to multiple applications across multiple computing environments; determining, based at least in part on processing at least a portion of the obtained data, at least one of the one or more modifiers applicable for use in executing at least one of the one or more automated actions in connection with at least a portion of the multiple applications; and executing the at least one of the one or (Continued)

more automated actions using the at least one determined modifier.

20 Claims, 20 Drawing Sheets

(51) Int. Cl.
 *G06F 8/36* (2018.01)
 *G06F 8/61* (2018.01)
 *G06F 8/76* (2018.01)

(56) References Cited

U.S. PATENT DOCUMENTS

| | | | |
|---|---|---|---|
| 9,264,486 | B2 | 2/2016 | Joshi et al. |
| 9,830,248 | B2 | 11/2017 | Potti et al. |
| 11,029,943 | B1* | 6/2021 | Delchev .................. H04L 67/34 |
| 11,042,369 | B1* | 6/2021 | Kimball .............. G06F 11/3466 |
| 2005/0193382 | A1* | 9/2005 | Goring ...................... G06F 8/65 |
| | | | 717/162 |
| 2010/0115512 | A1* | 5/2010 | Sakai .................. G06F 9/45533 |
| | | | 718/1 |
| 2010/0287313 | A1* | 11/2010 | Reierson ............. G06F 9/45529 |
| | | | 710/10 |
| 2011/0238722 | A1 | 9/2011 | Presley |
| 2014/0337825 | A1* | 11/2014 | Challa ...................... G06F 8/71 |
| | | | 717/168 |
| 2018/0357055 | A1* | 12/2018 | Apte ......................... G06F 8/51 |
| 2020/0174845 | A1* | 6/2020 | Toeroe .................. G06F 9/5005 |
| 2021/0271472 | A1* | 9/2021 | Lang ........................ G06F 8/76 |

OTHER PUBLICATIONS

Menychtas, Andreas, et al. "Software modernization and cloudification using the ARTIST migration methodology and framework." Scalable Computing: Practice and Experience 15.2 (2014): 131-152. (Year: 2014).*

Stehle, Edward, et al. "Migration of Legacy Software to Service Oriented Architecture." Department of Computer Science Drexel University Philadelphia, PA 19104 (2008): 2-5. (Year: 2008).*

Zenger, Matthias. "Keris: Evolving software with extensible modules." Journal of Software Maintenance and Evolution: Research and Practice 17.5 (2005): 333-362. (Year: 2005).*

* cited by examiner

FIG. 4

MOM MODIFIER    ⟵ 400

```
"action":{
  {
    "action":{
    Sh OneClickMomUpgrade.sh
    },
    "gitlabProjectFolder":
    "webServices",
    "pattern":"Webservices"
  }
  }

"description","mom upgrade",
    "id":"mom up",
    "item":"mom-upgrade",
    "modifierCategory":"Installed filesets upgrade",
    "parametersRequired":[]
  }
}
```

FIG. 6

```
MQPCFAgent mqAgent = new MQPCFAgent(qmgr, hostname, Integer.parseInt(port) , "MW_MQ_S_ADMIN");
writeResponse(response,mqAgent.mqscResponses);
responseSB.append(mqAgent.mqscResponses + "\n\n");

String[ ] lines = qmgrMqsc.toString().split("\\n");
for(String cmd:  lines)
{
    if(! (cmd.trim( ) .startsWith("*")) )
    {
        System.out.println("\nExecuting : " + cmd);
        response.getWriter( ).println("Executing : " + cmd);
        responseSB.append("\nExecuting : " + cmd + "\n");
        mqscResponse = mqAgent.RunMQSCCommand(cmd);
        responseSB.append( cmd + "\n" + mqscResponse + "\n\n");

System.out.println("Response : " + mqscResponse);
        writeResponse(response,mqAgent.mqscResponses);
    }
}
mqAgent.Close();
```

```
public static int checkinPendingChanges(final Workspace workspace, final String comment)
{
    PendingSet pendingSet = workspace.getPendingChanges( );
    int cs = 0;

if (pendingSet != null)
    {
        PendingChange[ ] pendingChanges = pendingSet.getPendingChanges( );
        if (pendingChanges != null)
        {
            cs = workspace.checkIn(pendingChanges, comment);
        }
    } return cs;
}
```

FIG. 9

```
cf_port = os.getenv("PORT")

# Only get method by default
@app.route('/get_modifiers')
def get_modifiers():
    modifiers_list = [ ]
    mongo_client = mongoDBConnector()
    db = mongo_client.EISS_common
    col = db.aic_upgrade_modifiers
    for document in col.find():
        modifiers_list.append(document)
    print("*********************\n")
    print(modifiers_list)
    print("\n*********************")
    page_sanitized = json.loads(json_util.dumps(modifiers_list))
    mongo_client.close()
    return jsonify(page_sanitized)
```

FIG. 10  /— 1000

```
def CheckGitlabYMLPresent(gitlab_main_project, selected_action, parameter_dictionary):
    print("Checking the Gitlab YML file present or not*")
    yml_file_present = False
    project_id = '91281'
    project_branch = 'master'
    gl = gitlab.Gitlab('https://gitlab.dell.com/', private_tokens=' ')
    project = gl.projects.get(project_id)
    files_in_project = project.repository_tree(ref=project_branch)
    print(files_in_project)
    print("*******************")
    print(gitlab_main_project)
    print("*******************")
    gitlabProjectFolder = selected_action['gitlabProjectFolder']
    print(gitlabProjectFolder)
    print("action to perform is")
    if selected_action['pattern'] != "all":
        print(selected_action['action'])
        total_action_script = [ ]
        cd_main_folder_string = "cd " + gitlab_main_project[0]
        cd_action_string = "cd " + gitlabProjectFolder
        total_action_script.append(cd_main_folder_string)
        total_action_script.append(cd_action_string)
        total_action_script.extend(selected_action['action'])
    elif selected_action['pattern'] == "all":
        total_action_script = [ ]
        cd_main_folder_string = "cd " + gitlab_main_project[0]
        total_action_script.append(cd_main_folder_string)
        total_action_script.extend(selected_action['action'])

print(total_action_script)
    #to create the script dynamically and push to gitlab
    createDynamicScript(gitlab_main_project, selected_action, parameter_dictionary)
```

```
cd $SPRING_PROJECT_NAME
git add .
git commit -m "Upgrading"
if [ 'git branch --list -a | grep origin/feature-dtc' ]
then
echo "upgrade branch already exists"
git checkout feature-dtc
git merge feature --strategy-options theirs
fi
git push -f https://username:access_token@gitlab.dell.com/$SPRING_PROJECT_PATH/$SPRING_PROJECT_NAME.git feature-dtc
```

```
git config --global user.name "kumara233"
git config --global user.email "kumara233"
git clone https://gitlab-ci-token:access_token@gitlab.dell.com/$SPRING_PROJECT_PATH/$SPRING_PROJECT_NAME.git
ls
cd $SPRING_PROJECT_NAME
git checkout feature
git branch feature-dtc
git checkout feature-dtc
```

```
#looks in those folders as specified in command line arguments
for i in range(1, len(sys.argv)):
    for file in select_files_in_subfolder(sys.argv[i]):
        tree=et.parse(file)
        root=tree.getroot()

#for version in parent--replaces the version with the one present in properties file
        for parent in root.findall('{http://maven.apache.org/POM/4.0.0}parent'):
            parent.find('{http://maven.apache.org/POM/4.0.0}version').text=config.get('Pom', 'version')

tree.write('pom.xml')

scm = root.find('{http://maven.apache.org/POM/4.0.0}scm')
        if scm is not None:
            root.remove(scm)
            tree.write('pom.xml')

dependencies = root.find('{http://maven.apache.org/POM/4.0.0}dependencies')

#geekcic.txt file contains the artifactId of dependencies as present in the cic parent
        file1=open('geekcic.txt','r')
        x=file1.readline()
        while x!='':
            x = x.rstrip()

#compares the artifactId of cic parent with that of component and removed the redundant dependencies
            for dependency in dependency.find('{http://maven.apache.org/POM/4.0.0}artifactId').text
                if artifactId==x:
                    dependencies.remove(dependency)
```

FIG. 14

```
file_count=$(find $SPRING_PROJECT_NAME -name "bootstrap.yml" | wc -l)
echo $file_count
if [ "file_count" -eq 0 ]
then
    echo "I am here"
    mkdir -p $SPRING_PROJECT_NAME/src/main/java/com/emc/it/eis
    cp Application.java $SPRING_PROJECT_NAME/src/main/java/com/emc/it/eis
    cp P2PServletInitializer.java $SPRING_PROJECT_NAME/src/mail/java/com/emc/it/eis
    cp application.properties $SPRING_PROJECT_NAME/src/main/resources
    cp web.xml $SPRING_PROJECT_NAME/src/main/webapp/WEB-INF
    mkdir -p $SPRING_PROJECT_NAME/src/main/webapp/META-INF && cp MANIFEST.MF $SPRING_PROJECT_NAME/src/main/webapp/WEB-INF/web.xml
    sed -i "s#application-name#$SPRING_PROJECT_NAME#g" $SPRING_PROJECT_NAME/src/main/webapp/WEB-INF/web.xml
    camelCaseName=`echo $SPRING_PROJECT_NAME | perl -pe 's/-(.)/\u$1/g' `
    echo $camelCaseName
    APPLICATION_CONFIG_PATH=`find . -name *application-config.xml`
    applicationConfigClassPath=`echo $APPLICATION_CONFIG_PATH | sed -n -e 's/^.*resources//p' `
    echo $applicationConfigClassPath
    sed -i "s#\$applicationConfigLocation#$applicationConfigClassPath#g" $SPRING_PROJECT_NAME/src/main/java/com/
fi camelCaseName=`echo $SPRING_PROJECT_NAME | perl -pe 's/-(.)/\u$1/g' `
cp bootstrap.yml $SPRING_PROJECT_NAME/src/main/resources
sed -i "s#\$applicationName#$camelCaseName#g" $SPRING_PROJECT_NAME/src/main/resources/bootstrap.yml
```

```
#reads the config.properties file
config = configparser.RawConfigParser()
config.read('config.properties')

#looks in those folders as specified in command line arguments
for i in range(1, len(sys.argv)):
    for root,dirs,files in os.walk(sys.argv[i]):
        for name in files:

#looks for the file with .java extension
            if name.endswith('.java'):
                name = os.path.join(root, name)

file = open(name, 'r+')

data=file.read()

substring="find"
                substring1="replace"

#makes the required changes as specified in the config.properties file
                for key in config['Replace']:

if substring in key:
                        find=config.get('Replace',key)

if substring1 in key:
                        data=data.replace(find,config.get('Replace',key))
```

```
action_parameters_required = {}
if len(actions_selected) == 1:
    print("Only Single Action is selected")
    action_to_perform = actions_selected[0]

#to get the gitlabProject and ProjectID for updating the parameters
for modifiers in modifiers_list:
    if Modifiers['id'] == action_to_perform:
        gitlab_main_project.append(modifiers['item'])
        for input_parameters_key, input_parameters_value in parameter_dictionary.items():
            for parameters in modifiers['parametersRequired']:
                if parameters['id'] == input_parameters_key:
                    print('Required Parameter Matched')
                    action_parameters_required[input_parameters_key] = input_parameters_value
print(action_parameters_required)
actions = modifiers['actions']
print("***** Action is **********")
print(actions)
selected_action = {}
if len(actions) > 1:
    print("More than one action is present. Now finding the correct Action")
    for action in actions:
        for key, item in action_parameters_required.items():
            if action[pattern'] == item:
                selected_action = action
                print(selected_action)
elif len(actions) == 1:
    selected_action = actions[0]
print(selected_action['gitlabProjectFolder'])
checkGitlabYMLPresent(gitlab_main_project, selected_action, action_parameters_required)
```

EXTENSIBLE UPGRADE AND MODIFICATION AS A SERVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for managing applications using such systems.

BACKGROUND

Challenges exist with legacy application modification and migration. For example, with respect to legacy application migration, conventional application management techniques involve time-consuming silo work in terms of manually determining dependencies, modifying each necessary component, and subsequently migrating the application to a new and/or different system. Such techniques are error-prone and resource-intensive.

By way of further example, microservices architecture-based development commonly involves similar changes to be applied across multiple services and/or components. However, using conventional application management techniques, migration and upgrade operations in such contexts typically require devoting a significant amount of time and resources within the development effort to carry out similar and/or identical operations across multiple services and/or components, as such conventional application techniques often are use case-specific and have limited reusability.

SUMMARY

Illustrative embodiments of the disclosure provide extensible upgrade and modification as a service (XuMaaS). An exemplary computer-implemented method includes processing one or more modifiers, wherein each modifier includes an independent processing unit having a given canonical structure and is configured to execute one or more automated actions related to at least one of application modification and application migration. The method also includes obtaining data pertaining to multiple applications across multiple computing environments, and determining, based at least in part on processing at least a portion of the obtained data, at least one of the one or more modifiers applicable for use in executing at least one of the one or more automated actions in connection with at least a portion of the multiple applications. Further, the method includes executing the at least one of the one or more automated actions using the at least one determined modifier.

Illustrative embodiments can provide significant advantages relative to conventional application management techniques. For example, problems associated with error-prone and resource-intensive application modification and/or migration efforts are overcome in one or more embodiments through executing automated application modification and/or or migration actions using at least one configurable modifier.

These and other illustrative embodiments described herein include, without limitation, methods, apparatus, systems, and computer program products comprising processor-readable storage media.

BRIEF DESCRIPTION OF THE DRAWINGS

FIG. 4 shows an example code snippet for an example message-oriented middleware (MOM) modifier in an illustrative embodiment.

FIG. 6 shows an example code snippet for building a target message queue (MQ) system in an illustrative embodiment.

FIG. 7 shows an example code snippet for object changes in an illustrative embodiment.

FIG. 9 shows an example code snippet for a modifier representational state transfer (REST) application programming interface (API) in an illustrative embodiment.

FIG. 10 shows an example code snippet for dynamic GitLab-ci.yml file creation in an illustrative embodiment.

FIG. 11 shows an example code snippet for implementing a Git check-in in an illustrative embodiment.

FIG. 12 shows an example code snippet for implementing a Git check-out in an illustrative embodiment.

FIG. 13 shows an example code snippet for a pom.xml change module in an illustrative embodiment.

FIG. 14 shows an example code snippet for application bootstrapping in an illustrative embodiment.

FIG. 15 shows an example code snippet for a code and configuration change module in an illustrative embodiment.

FIG. 17 shows an example code snippet for code snipping modifiers in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
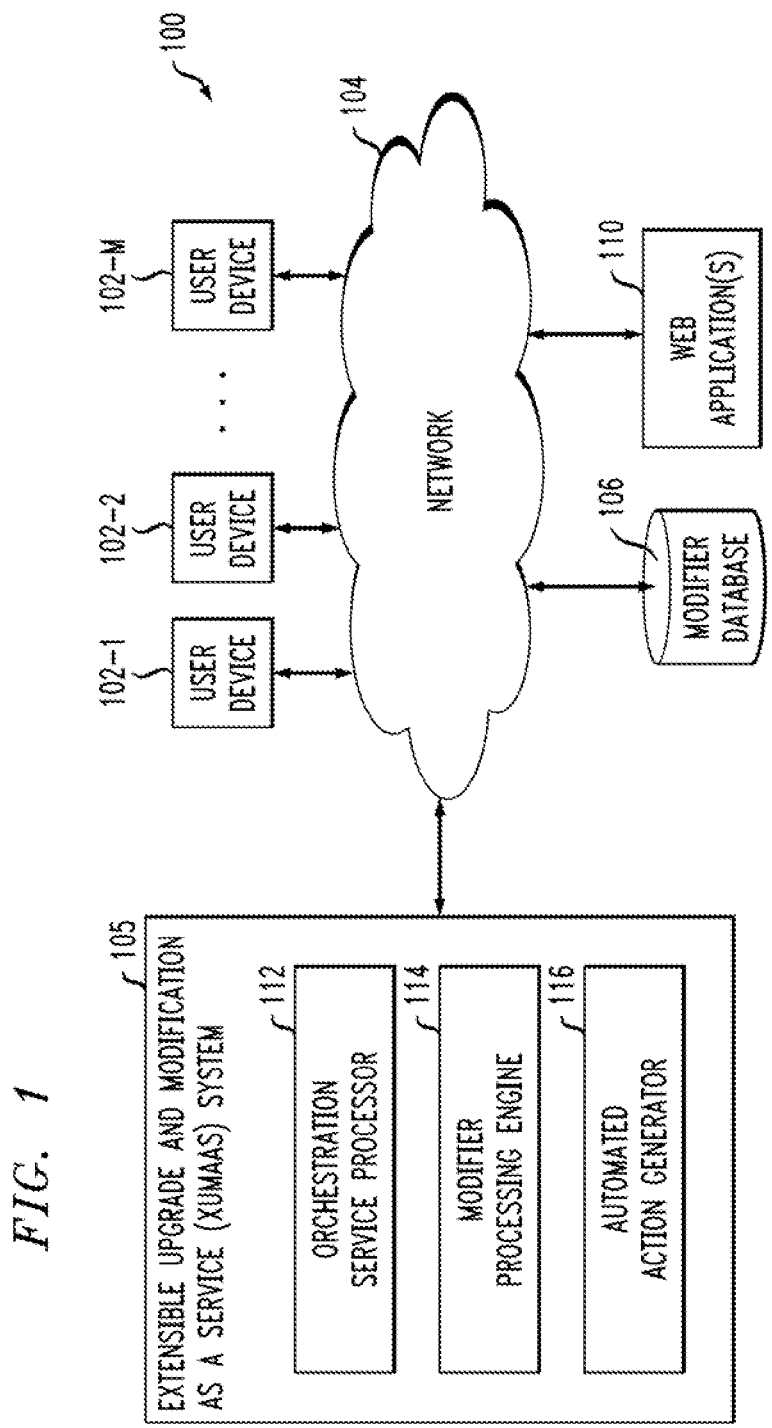
FIG. 1 shows an information processing system configured for implementing extensible upgrade and modification as a service in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is XuMaaS system 105 and one or more web applications 110 (e.g., one or more web applications to be upgraded and/or migrated in connection with one or more of the user devices 102).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, XuMaaS system 105 can have an associated database 106 configured to store data pertaining to modifiers, which comprise, for example, a collection of available modifiers (e.g., existing modifiers, newly-created modifiers, etc.), as further detailed herein.

The database 106 in the present embodiment is implemented using one or more storage systems associated with XuMaaS system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with XuMaaS system 105 can be one or more input-output devices, which illustratively comprise keyboards, displays or other types of input-output devices in any combination. Such input-output devices can be used, for example, to support one or more user interfaces to XuMaaS system 105, as well as to support communication between XuMaaS system 105 and other related systems and devices not explicitly shown.

Additionally, XuMaaS system 105 in the FIG. 1 embodiment is assumed to be implemented using at least one processing device. Each such processing device generally comprises at least one processor and an associated memory, and implements one or more functional modules for controlling certain features of XuMaaS system 105.

More particularly, XuMaaS system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows XuMaaS system 105 to communicate over the network 104 with the user devices 102, and illustratively comprises one or more conventional transceivers.

The XuMaaS system 105 further comprises an orchestration service processor 112, a modifier processing engine 114, and an automated action generator 116.

It is to be appreciated that this particular arrangement of modules 112, 114 and 116 illustrated in XuMaaS system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for implementing extensible upgrade and modification as a service involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of XuMaaS system 105, modifier database 106, and web application(s) 110 can be on and/or part of the same processing platform.

An exemplary process utilizing modules 112, 114 and 116 of an example XuMaaS system 105 in computer network 100 will be described in more detail with reference to the flow diagram of FIG. 19.

Accordingly, at least one embodiment includes providing a comprehensive, scalable, and secure solution for maintaining the codebase of the latest version of at least one application. Information technology (IT) modernization is a process that includes moving applications and/or components from end of life (EOL) or soon-to-be EOL to updated and/or new states and/or versions. Modernization projects can go beyond typical software or hardware upgrades to include a much more diverse landscape of operations.

As noted herein, challenges with application modernization commonly involve considerations of cost and complexity. For example, application rewrites and/or upgrades using conventional approaches typically require significant efforts, and scaling a given application has to be supported by the given infrastructure, which may require redesigning one or more infrastructure strategies. Return on investment (ROI) associated with such operations commonly cannot be directly attributed to the enterprise's and/or user's revenue, and legacy infrastructure can potentially inhibit the pace of innovation and time to market in many instances. Also, many legacy systems have been built on tightly coupled architecture, which can hinder cloud enablement and integration with native digital platforms.

In accordance with one or more embodiments, benefits of application modernization can include re-platforming applications to the cloud for application scale and performance, as well as long-term data center and IT strategy. Such benefits can also include exposing the functionality of existing applications to be consumed via application programming interface (API) by other services and improving the speed of new feature delivery. As such, one or more embodiments include generating and/or implementing a unified migration framework to upgrade legacy applications in a shift and lift manner. As used herein, shift and lift refers to a process of migrating existing applications, processes, servers, etc. from at least a first system to at least a second system with minimal impact on the at least a first system.

As further detailed herein, such a framework provides features such as, for example, reducing a developer's efforts by enabling orchestration of the application migration process, security vulnerability remediations (e.g., service account password reset, software security scans, programmatic code fixes, etc.), dynamic API upgrades, cloud infrastructure support, knowledge as a service, messaging lift and shift from legacy system to one or more modern data centers, business process simplifications, automation for management and operations, application upgrades to latest and/or improved revisions, user interface for facilitating a complete migration journey, platform redesigns, and architecture as a service.

Accordingly, and as described herein in connection with one or more embodiments, XuMaaS provides a unified framework for users to publish and subscribe to automation operations, and orchestrate such operations for enabling modernization of one or more applications. In such an embodiment, XuMaaS includes an orchestration service optimizer (OSO), which enables users to integrate multiple standalone applications programmatically by providing an orchestration-based approach into a single unified continuous integration and continuous delivery (CI/CD) pipeline that simplifies and facilitates the modernization. An OSO, in such an embodiment, can operate in conjunction with a modifier processing engine (MPE), which utilizes one or more uniquely designed data structures, also referred to herein as modifiers. As used herein, a modifier can include any standalone orchestration solution that follows a canonical data structure to onboard on XuMaaS. As also further detailed herein, in one or more embodiments, an XuMaaS system is built on top of a loosely-coupled architecture that provides a unified platform for orchestrations to be configurable and extendable.

One or more embodiments also include automatically detecting and reported security vulnerabilities, as well as dynamically monitoring applications with respect to new and/or updated security standards and/or guidelines. Such an embodiment can also include inspecting and/or remediating reported code vulnerabilities in connection with one or more integration operations.

By way of illustration, consider an example use case involving cloud migration of one or more applications. As part of the EOL and cloud migration of an existing application, a need may exist to upgrade one or more application servers and software. Such operations can involve, for example, upgrading many integrations across multiple environments with multiple Spring Batch integrations. At least one embodiment, in connection with such an example use case, can include migrating all of the relevant application code written in old versions of Java, Spring, and/or Spring Boot, which might include one or more security vulnerabilities. Such vulnerabilities would be identified, remediated, deployed, and revalidated across multiple environments (and potentially across various business units) via such an embodiment.

Additionally, at least one embodiment includes implementing in-built boilerplates as well as software development and IT operations (DevOps) support, thereby facilitating and/or enabling reusability capabilities. Such an embodiment includes validating and updating dependency management, programmatically creating migration commands, preserving existing objects as well as build and deployment pipelines, and implementing OneClick ((XC) deployment across multiple environments.

One or more embodiments can also include implementing technology stack upgrades. In one or more use cases, an EOL system proceeds with a technology upgrade as well as modifications to the existing codebase. In such an example use case, at least one embodiment can include dynamically migrating relevant applications to new software.

Figure 2:
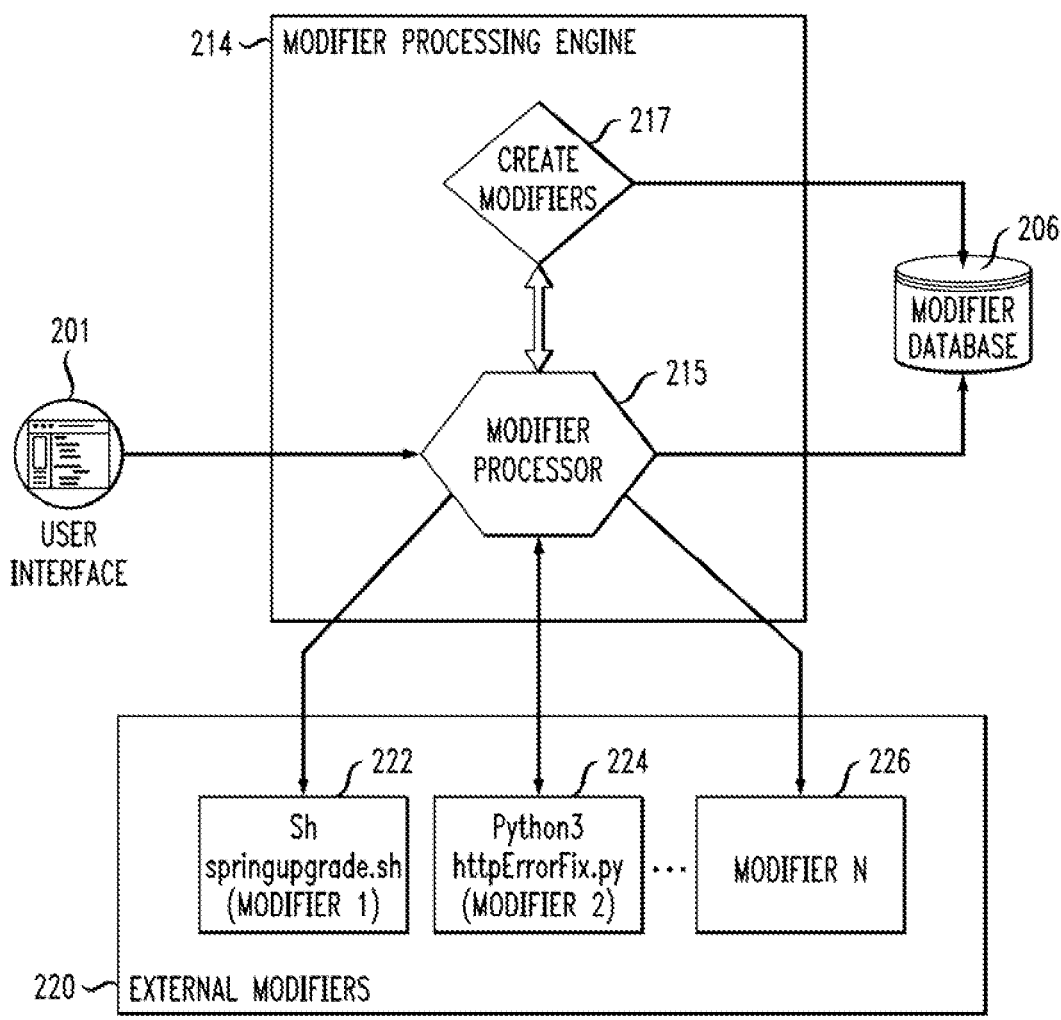
FIG. 2 shows an example solution design using an XuMaaS system in an illustrative embodiment.

FIG. 2 shows an example solution design using an XuMaaS system in an illustrative embodiment. By way of illustration, FIG. 2 depicts modifier processing engine 214, which includes a modifier processor 215 and a modifier creation module 217, interacting with user interface 201, modifier database 206, and a set of external modifiers 220. Specifically, modifier processor 215 processes input from user interface 201 and one or more modifiers input from modifier creation module 217, as well as modifiers 222, 224 and 226 from the set of external modifiers 220, and interacts with modifier database 206 based on such processing (e.g., modifier processor updates the modifier database 206 with one or more new and/or updated modifiers for subsequent and/or future use). As also depicted in FIG. 2, modifier creation module 217 interacts with modifier database 206 (e.g., inputting one or more newly-created modifiers).

As detailed herein, modifiers represent one or more sets of independent processing units that follow at least one standard canonical structure to trigger different optimization solutions. Also, in one or more embodiments, modifiers are reusable by sharing the given canonical system across solutions. Further, each modifier can be executed separately as well as combined with one or more other modifiers (e.g., to accomplish complex orchestration requirements).

Additionally, one or more embodiments include implementing a modifier catalog (e.g., modifier database 106 and 206), which can represent, for example, a marketplace for available modifiers for one or more users. Such an embodiment can also include adding new modifiers to a catalog and/or inheriting and incorporating existing modifiers in a catalog.

Figure 3:
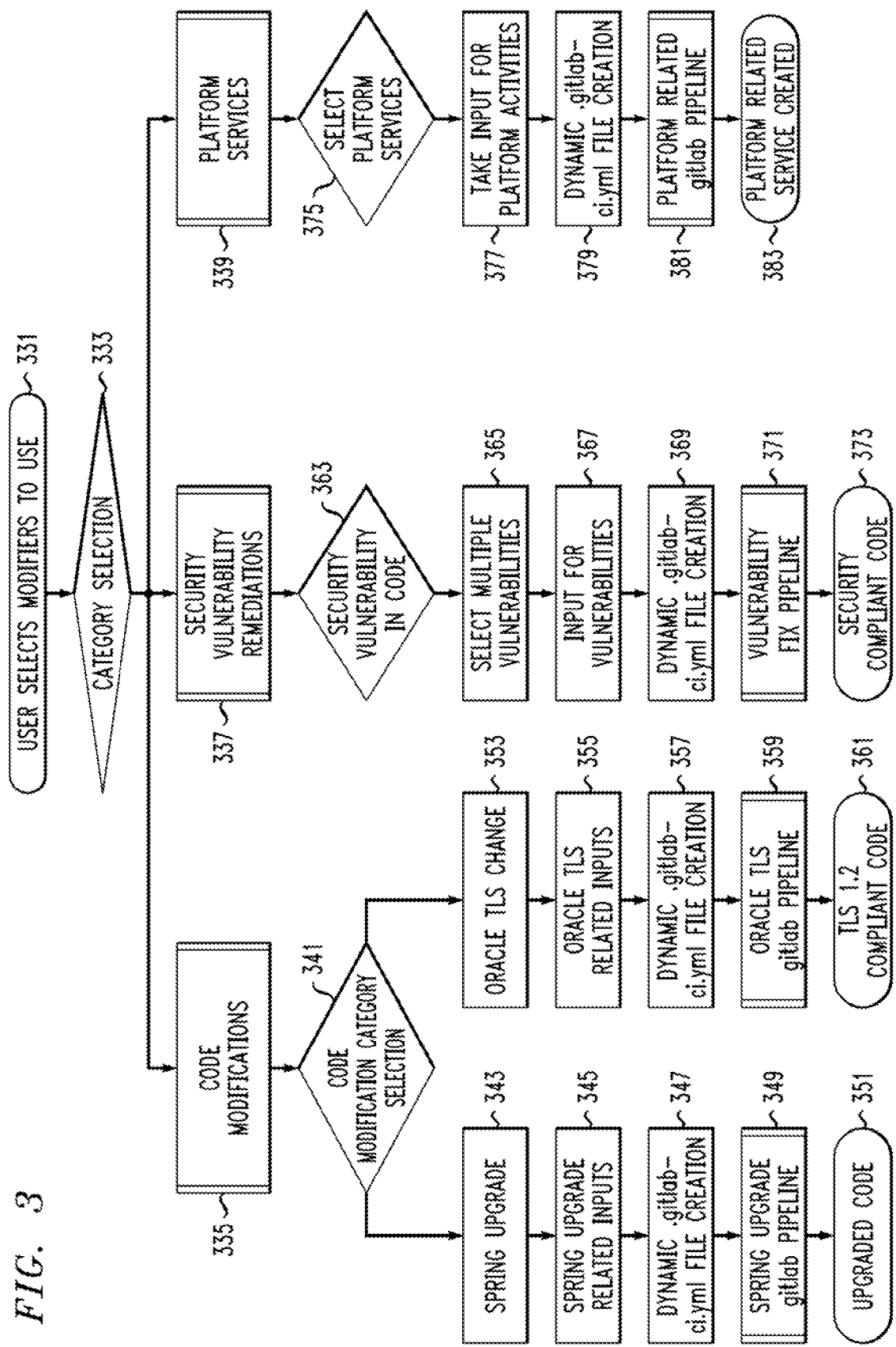
FIG. 3 shows an example modifiers flow diagram in an illustrative embodiment.

FIG. 3 shows an example modifiers flow diagram in an illustrative embodiment. As depicted in FIG. 3, step 331 includes a user selecting one or more modifiers to use, and step 333 includes making a category selection between code modifications 335, security vulnerability remediations 337, and platform services 339. If code modifications 335 is selected, then step 341 includes making a code modification category selection between a Spring upgrade 343 and an Oracle transport layer security (TLS) change 353. If a Spring upgrade 343 is selected, then step 345 includes selecting and/or providing Spring upgrade-related inputs, step 347 includes dynamically creating a gitlab.ci.yml file, step 349 includes maintaining a Spring upgrade GitLab pipeline, and step 351 includes upgrading the relevant code. If the Oracle TLS change 353 is selected, then step 355 includes selecting and/or providing Oracle TLS-related inputs, step 357 includes dynamically creating a gitlab.ci.yml file, step 359 includes maintaining an Oracle TLS GitLab pipeline, and step 361 includes generating TLS compliant code.

Referring again to step 333, if security vulnerability remediations 337 are selected, step 363 includes selecting vulnerabilities in code, which further includes selecting multiple vulnerabilities in step 365, selecting and/or providing input for the vulnerabilities in step 367, dynamically creating a gitlab.ci.yml file in step 369, maintaining a vulnerability fix pipeline in step 371, and generating security compliant code in step 373. If platform services 339 are selected, then step 375 includes selecting particular platform services, which further includes taking input for one or more platform activities in step 377, dynamically creating a gitlab.ci.yml file in step 379, maintaining a related GitLab pipeline in step 381, and creating at least one platform-related service in step 383.

FIG. 4 shows an example code snippet for an example MOM modifier in an illustrative embodiment. In this embodiment, example code snippet 400 is executed by or under the control of at least one processing system and/or device. For example, the example code snippet 400 may be viewed as comprising a portion of a software implementation of at least part of XuMaaS system 105 of the FIG. 1 embodiment.

The example code snippet 400 illustrates various actions involved in implementing a MOM modifier, such as, for example, identifying a particular OC MOM upgrade action, identifying a folder location, identifying a modifier description and a modifier category, identifying one or more required parameters, etc.

It is to be appreciated that this particular example code snippet shows just one example implementation of a MOM modifier, and alternative implementations of the process can be used in other embodiments.

As also detailed herein, one or more embodiments include providing messaging platform support. Many integration design patterns have a dependency on the messaging layers for communications, and, in such an embodiment, at least one relevant modifier can take care of OC migration as well as the creation and binding of respective queues and/or topics on individual platforms.

Figure 5:
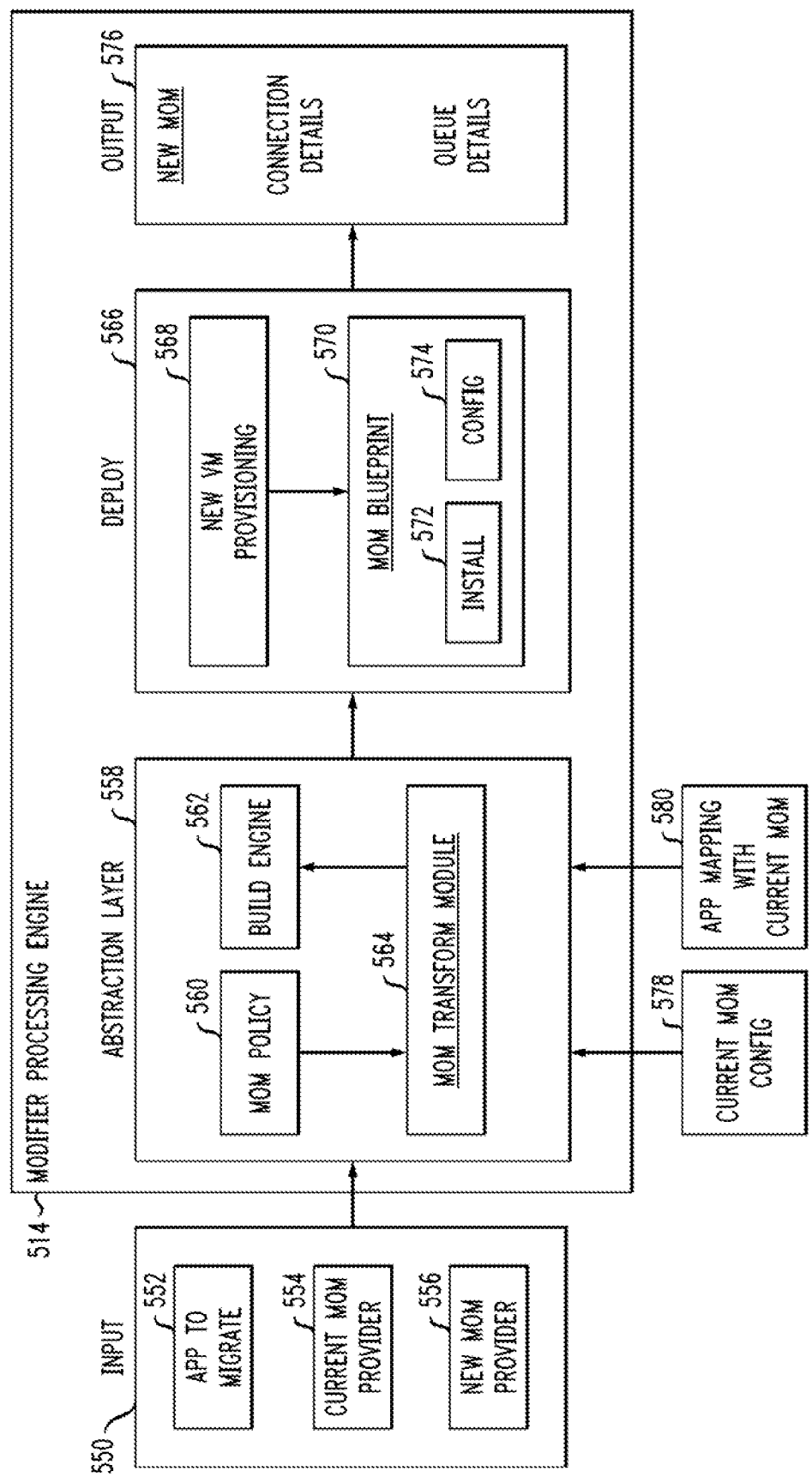
FIG. 5 shows an example use case involving MOM-related migration in an illustrative embodiment.

FIG. 5 shows an example use case involving MOM-related migration in an illustrative embodiment. As depicted in FIG. 5, one or more embodiments include building and/or facilitating a build between environments on an OC for MOM infrastructure. Such an embodiment can also include implementing one or more features to cross-build different MOMs on a single button click. As depicted, the FIG. 5 example use case includes input 550 and a modifier processing engine 514, which includes an abstraction layer 558, a deploy engine 566, and an output 576. More specifically, input 550 can include various inputs required to initiate MOM migration execution. For example, FIG. 5 depicts individual input elements that include application details 552 to migrate to a new MOM, details of an existing/current MOM provider 554 used by the application, and details of a new MOM provider 556 to be used by the application.

As also depicted in FIG. 5, data flow from input 550 to modifier processing engine 514 provides custom values for further computation purposes. As detailed herein, modifier processing engine 514 can encompass MOM migration execution by processing inputs (via 550) and implementing MOM migration. Individual elements within modifier processing engine 514 can include the following (as also depicted in FIG. 5). An abstraction layer 558 carries out computations and transformations, and builds an engine to produce artifacts which flow to deploy engine 566. Abstraction layer 568 can include MOM policy 560, which extracts individual MOM policies as governed with respect to each MOM product, and provides such as input to MOM transform module 564. MOM transform module 564 converts existing MOM details received from input 550 and new MOM policy 560 into the new MOM's standard objects, which are provided as input to build engine component 562 (which prepares a build package computed from various inputs of current and new MOM information). As also depicted in FIG. 5, additional inputs received at abstraction layer 558 include current MOM configuration 578, which extracts runtime configuration information of the current MOM from at least one production system, and application mapping with current MOM 580, which extracts application MOM objects from at least one production system.

Abstraction layer 558, as noted, provides input to deploy engine 566, which triggers new MOM infrastructure provisioning, which ultimately flows to output module 576. As illustrated in FIG. 5, deploy engine 566 includes a new virtual machine (VM) provisioning component 568, which triggers new VM infrastructure to create dedicated VMs for MOM deployment, as per given architecture. After VMs are created, MOM blueprint module 570 is triggered and installs new MOM and its runtime kernel required to run it efficiently. Additionally, MOM blueprint module 570 includes an install component 572, which installs the new MOM base version and its latest fix-pack, as well as configuration component 574, which creates at least one requisite filesystem structure and permissions to run the new MOM. After new MOM infrastructure is created and started, its runtime connection details and objects are extracted via output module 576 to share with the application to migrate to the new MOM.

FIG. 6 shows an example code snippet for building a target MQ system in an illustrative embodiment. In this embodiment, example code snippet 600 is executed by or under the control of at least one processing system and/or device. For example, the example code snippet 600 may be viewed as comprising a portion of a software implementation of at least part of XuMaaS system 105 of the FIG. 1 embodiment.

In connection with example code snippet 600, generate MQSC.java includes interfaces to generate required objects for a target MQ system based on user input. Such a code snippet 600 also includes pushing the required objects remotely to the target MQ to perform a build, and additionally automatically checking-in the code to a source control.

It is to be appreciated that this particular example code snippet shows just one example implementation of building a target MQ system, and alternative implementations of the process can be used in other embodiments.

FIG. 7 shows an example code snippet for object changes in an illustrative embodiment. In this embodiment, example code snippet 700 is executed by or under the control of at least one processing system and/or device. For example, the example code snippet 700 may be viewed as comprising a portion of a software implementation of at least part of XuMaaS system 105 of the FIG. 1 embodiment. Specifically, example code snippet 700 checks if there are any delta changes, and if there are any such changes, then the code 700 obtains such information.

In connection with example code snippet 700, a class such as depicted in FIG. 7 can additionally take care of checking-in the scripts and/or objects, as well as the build output, to a source control. As used herein, checking-in refers to an assessment that if no other users have also made changes to the file and engaged it while being worked on by a given user, the given user's version of the file is utilized. However, if that is not the case, then the check-in function fails.

It is to be appreciated that this particular example code snippet shows just one example implementation of object changes, and alternative implementations of the process can be used in other embodiments.

At least one embodiment includes API gateway enablement via implementing a modifier which can create a new gateway uniform resource locator (URL) or enhance an existing endpoint, changing the security, configuration, etc. Additionally, as detailed herein, one or more embodiments include facilitating code modernization, wherein upgrading one or more applications includes enhancing existing code to one or more latest versions of such applications, which is carried out using at least one modifier which identifies common dependencies and configurations for different design patterns and upgrades the components to the newest revision(s). Supported design patterns can include, for example, publish-subscribe, one or more web services, batch processing, microservice architectures, etc.

Figure 8:
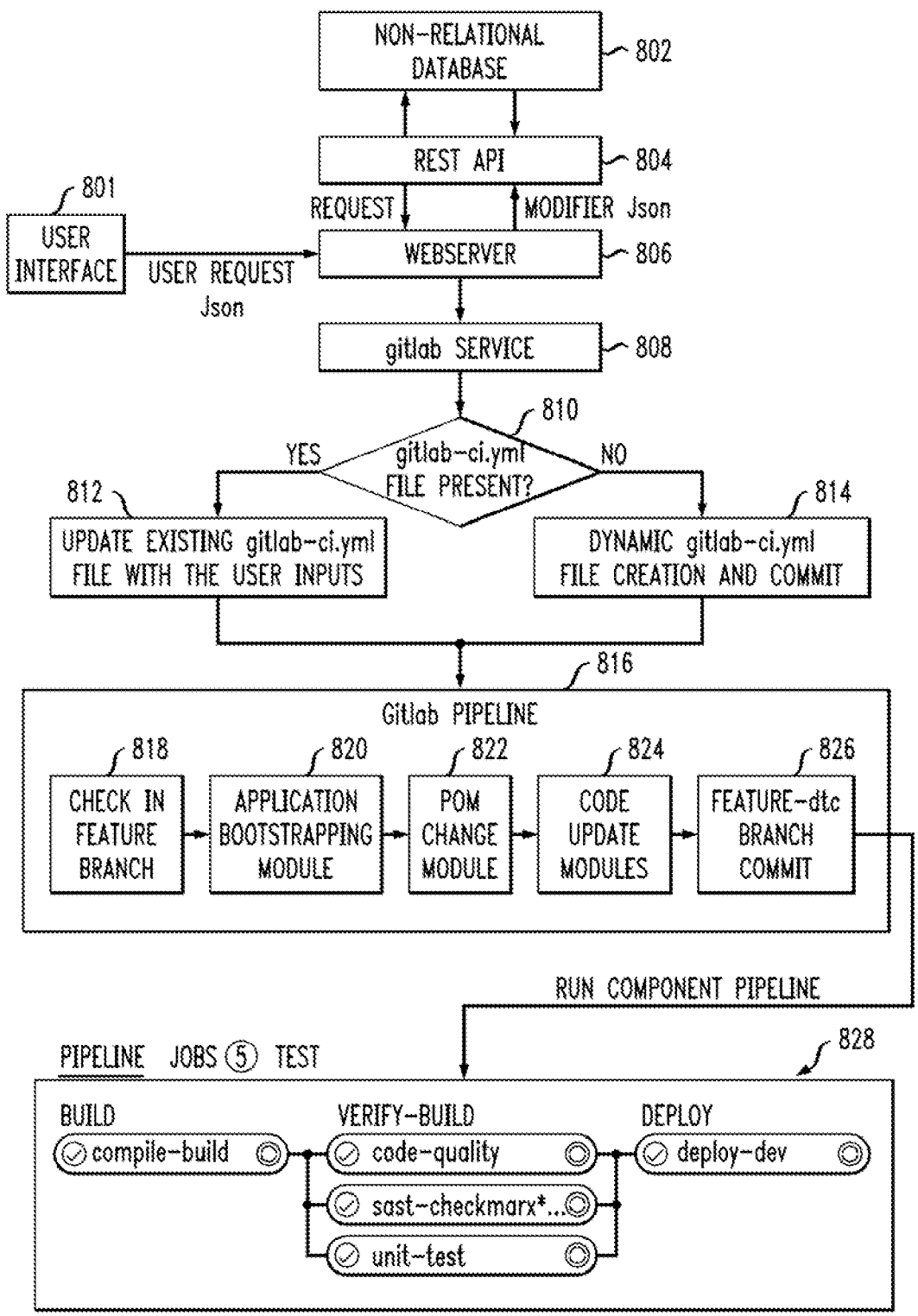
FIG. 8 shows an example workflow of generating and executing a pipeline in an illustrative embodiment.

FIG. 8 shows an example workflow of generating and executing a pipeline in an illustrative embodiment. By way of illustration, FIG. 8 depicts phases included during execution of a modifier. For example, non-relational database 802 holds the modifier data structure. REST API 804 includes different hypertext transfer protocol (HTTTP) methods triggered as required depending upon the action provided by the user in user interface (UI) 801. Webserver 806 hosts the UI 801 as well as the REST API 804. Also, based on the input(s) provided by the user via UI 801, gitlabservice component 808 is invoked. Component 810 represents the decision-making stage wherein XuMaaS checks if the gitlab-ci.ymi is present or not. Step 812 includes updating a gitlab-ci.yml file based on the user input(s) from UI 801. However, if the gitlab-ci.yml file is not present, then the gitlab-ci.yml file is dynamically created in step 814. GitLab pipeline 816 represents the GitLab stages that occur for at least one modifier DTC migration. For example, stage 818 checks-in the required code branch, stage 820 bootstraps the code base, stage 822 makes one or more pom-related changes in the module, stage 824 makes one or more other code-related changes, and stage 826 checks-in the code to a new feature-dtc branch, generating a pipeline output 828.

FIG. 9 shows an example code snippet for a modifier REST API in an illustrative embodiment. In this embodiment, example code snippet 900 is executed by or under the control of at least one processing system and/or device. For example, the example code snippet 900 may be viewed as comprising a portion of a software implementation of at least part of XuMaaS system 105 of the FIG. 1 embodiment.

The example code snippet 900 illustrates steps of obtaining a list of modifiers and printing the obtained list of modifiers in addition to one or more formatting actions. It is to be appreciated that this particular example code snippet shows just one example implementation of a modifier REST API and alternative implementations of such a feature can be used in other embodiments.

FIG. 10 shows an example code snippet for dynamic GitLab-ci.yml file creation in an illustrative embodiment. In this embodiment, example code snippet 1000 is executed by or under the control of at least one processing system and/or device. For example, the example code snippet 1000 may be viewed as comprising a portion of a software implementation of at least part of XuMaaS system 105 of the FIG. 1 embodiment.

The example code snippet 1000 illustrates steps including printing files from a project repository pertaining to a particular project, printing one or more actions related to the project, and creating a dynamic scripts based at least in part on the action and the one or more actions. It is to be appreciated that this particular example code snippet shows just one example implementation of dynamic GitLab-ci.yml file creation, and alternative implementations of the process can be used in other embodiments.

FIG. 11 shows an example code snippet for implementing a Git check-in in an illustrative embodiment. In this embodiment, example code snippet 1100 is executed by or under the control of at least one processing system and/or device. For example, the example code snippet 1100 may be viewed as comprising a portion of a software implementation of at least part of XuMaaS system 105 of the FIG. 1 embodiment.

The example code snippet 1100 illustrates steps of identifying a conditional element and/or sequence, and implementing a Git check-out feature and a Git merge feature. It is to be appreciated that this particular example code snippet shows just one example implementation of a Git check-in, and alternative implementations of the process can be used in other embodiments.

FIG. 12 shows an example code snippet for implementing a Git check-out in an illustrative embodiment. In this embodiment, example code snippet 1200 is executed by or under the control of at least one processing system and/or device. For example, the example code snippet 1200 may be viewed as comprising a portion of a software implementation of at least part of XuMaaS system 105 of the FIG. 1 embodiment.

The example code snippet 1200 illustrates identifying Git configuration information, as well as implementing a Git branch feature and a Git check-out feature. It is to be appreciated that this particular example code snippet shows just one example implementation of Git check-out, and alternative implementations of the process can be used in other embodiments.

FIG. 13 shows an example code snippet for a pom.xml change module in an illustrative embodiment. In this embodiment, example code snippet 1300 is executed by or under the control of at least one processing system and/or device. For example, the example code snippet 1300 may be viewed as comprising a portion of a software implementation of at least part of XuMaaS system 105 of the FIG. 1 embodiment.

The example code snippet 1300 illustrates one or more actions carried out by a porn change module (such as, for example, component 822 in FIG. 8). The code snippet 1300 includes updating the parent version in the pom., and removing all unrequired tags in the pom.xml as well as any unrequired dependency and dependency version. The code snippet 1300 also includes adding the required dependencies for the change required.

It is to be appreciated that this particular example code snippet shows just one example implementation of a pom.xml change module, and alternative implementations of the process can be used in other embodiments.

FIG. 14 shows an example code snippet for application bootstrapping in an illustrative embodiment. In this embodiment, example code snippet 1400 is executed by or under the control of at least one processing system and/or device. For example, the example code snippet 1400 may be viewed as comprising a portion of a software implementation of at least part of XuMaaS system 105 of the FIG. 1 embodiment.

The example code snippet 1400 illustrates one or more actions carried out by an application bootstrapping module (such as, for example, module 820 in FIG. 8). For bootstrapping an application, the code snippet 1400 includes copying all required files. Based on the application name of the code base, code snippet 1400 also includes updating the application configuration name in the required places at the copied file for bootstrapping.

It is to be appreciated that this particular example code snippet shows just one example implementation of application bootstrapping, and alternative implementations of the process can be used in other embodiments.

FIG. 15 shows an example code snippet for a code and configuration change module in an illustrative embodiment. In this embodiment, example code snippet 1500 is executed by or under the control of at least one processing system and/or device. For example, the example code snippet 1500 may be viewed as comprising a portion of a software implementation of at least part of XuMaaS system 105 of the FIG. 1 embodiment.

The example code snippet 1500 illustrates steps including reading a configuration properties file, analyzing folders specified in command line arguments, and making required changes as specified in a given configuration properties file. It is to be appreciated that this particular example code snippet shows just one example implementation of a code and configuration change module, and alternative implementations of the process can be used in other embodiments.

Also, as detailed herein, one or more embodiments include enhancing security and vulnerability management. In such an embodiment, code vulnerabilities identified by code scanning tools can be remediated and fixed via at least one modifier which is used to improve vulnerability scores and perform various actions such as, for example, static code analysis and security scans of applications, as well as quality checks of code and remedies to ensure proper code coverage and that the system is appropriately secured and tested. Such a modifier is also used to enable an application to connect to any third-party security scanning utilities.

Figure 16:
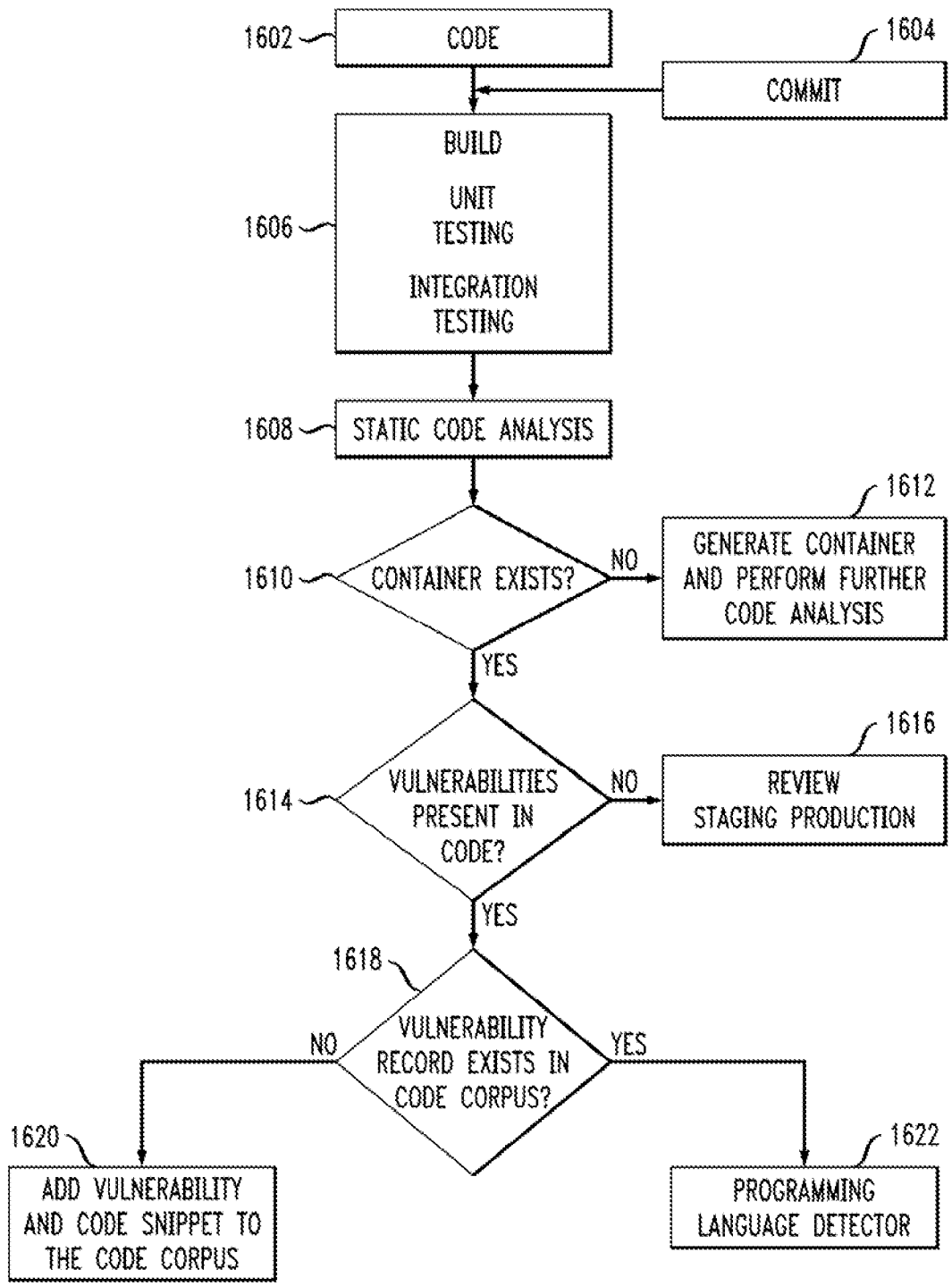
FIG. 16 shows an upgrade lifecycle of an example code upgrade in an illustrative embodiment.

FIG. 16 shows an upgrade lifecycle of an example code upgrade in an illustrative embodiment. By way of illustration. FIG. 16 depicts one or more actions of an example modifier related to code security. 1602 represents the code base, and when a commit 1604 happens to code base 1602, code base 1602 goes through a build cycle 1606, 1608 refers to the static analysis phase of the code base 1602, which points out one or more vulnerabilities in the code. Step 1610 includes the decision phase to check if at least one container for code base 1602 exists in the static analysis tool. Step 1612 includes creating such a container if one is not present. When no vulnerabilities are present in step 1614, the code can be migrated to a staging and/or production environment 1616. If vulnerabilities are found in step 1614, if the vulnerability and solution exists in a code corpus (a positive determination in step 1618), then programming language detector 1622 detects the language and fixes the vulnerability. As used herein, a code corpus can include a database that includes one or more solutions for existing vulnerabilities. If the vulnerability and fix does not exist (a negative determination in step 1618), then the vulnerability and code snippet is added to the code corpus via step 1620.

FIG. 17 shows an example code snippet for code snipping modifiers in an illustrative embodiment. In this embodiment, example code snippet 1700 is executed by or under the control of at least one processing system and/or device. For example, the example code snippet 1700 may be viewed as comprising a portion of a software implementation of at least part of XuMaaS system 105 of the FIG. 1 embodiment.

The example code snippet 1700 illustrates steps of identifying one or more selected actions, and obtaining a gitlab project and project identifier (1D) for updating particular parameters associated with the selected action(s). It is to be appreciated that this particular example code snippet shows just one example implementation of code snipping modifiers, and alternative implementations of the process can be used in other embodiments.

Figure 18:
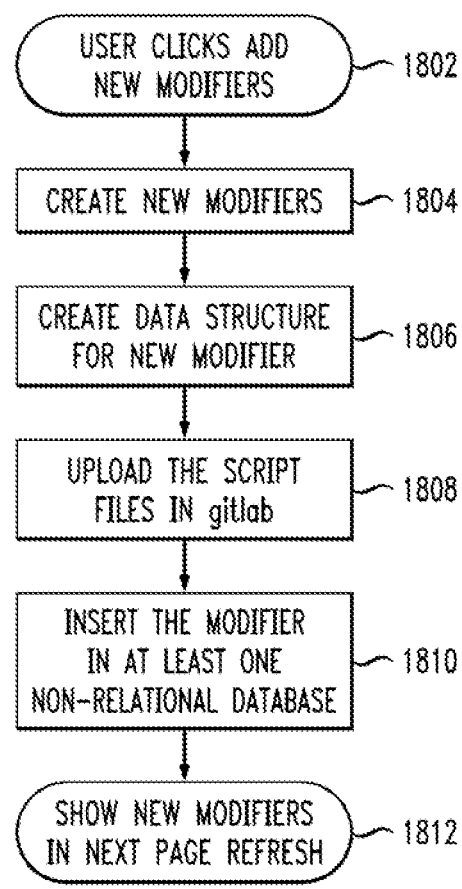
FIG. 18 shows an example new modifier lifecycle in an illustrative embodiment.

FIG. 18 shows an example new modifier lifecycle in an illustrative embodiment. As depicted in FIG. 18, step 1802 includes a user selecting (e.g., clicking on) an option and/or prompt to add one or more new modifiers. Step 1804 includes creating one or more new modifiers, while step 1806 includes creating at least one data structure for the new modifier(s). Additionally, step 1808 includes updating relevant script files in a given gitlab, step 1810 includes inserting the new modifier(s) in a cross-platform document-oriented database program (e.g., MongoDB), and step 1812 includes showing (to the user(s)) the new modifier(s) in the next page refresh.

As detailed herein, one or more embodiments include implementing a modifier processing engine, which enables users to create one or more new modifiers, give access to any specific modifier(s), and dynamically provide control on DevOps pipelines and configuration systems. Also, such an embodiment can include implementing a modifier controller, which is a centralized authority that controls and coordinates among different modifier services. Such a controller manages the creation of new modifiers and/or the execution of existing modifiers. For example, once a new modifier is added to a modifier database, the modifier controller creates a dynamic register entry by starting a canonical data structure at runtime and persisting such a structure into the database. Whenever, for instance, a user refreshes the given modifier controller, newly added modifiers will be made available to the user. Additional capabilities and/or responsibilities of modifiers controllers can include, for example, auto-discovery of modifier services, enabling routing of different requests to designate modifiers, throttling, access control, and data security on modifiers.

Additionally or alternatively, at least one embodiment includes a user experience center, which can include a central control unit which serves as a single-entry point for users and developers, and provides features such as, for example, the ability to add a new modifier or reuse an existing modifier, the ability to migrate applications by providing minimal information and configurations, automatic selection of the latest security and vulnerability fixes, access control and security, etc. Further, one or more embodiments include implementing CI/CD. Commonly, developers spend significant time building, testing, scanning, and subsequently deploying various components in different environments. Such a complex process can often consume considerable amounts of time and resources; however, in one or more embodiments, such processes are automated and controlled by at least one CU/CD pipeline for the entire solution. Accordingly, actions carried out on the framework of such an embodiment are linked with a CI/CD pipeline, which internally takes care of building, scanning, test cases, and deploying the given components onto the respective environments.

Figure 19:
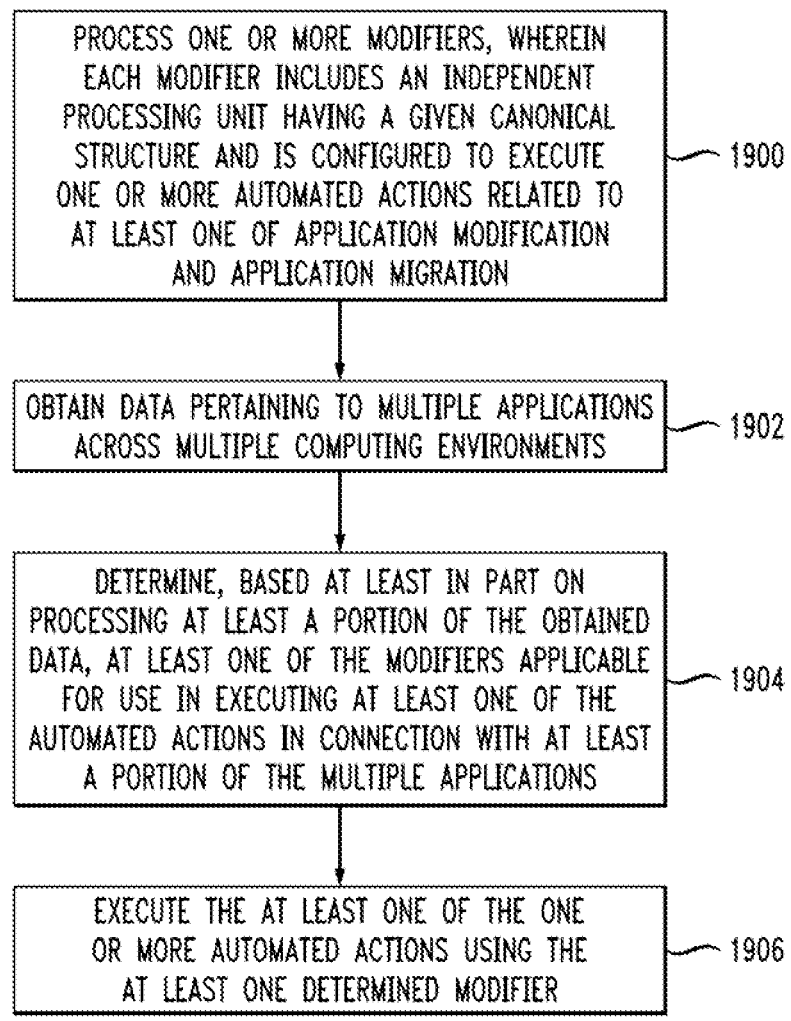
FIG. 19 is a flow diagram of a process for implementing extensible upgrade and modification as a service in an illustrative embodiment.

FIG. 19 is a flow diagram of a process for implementing extensible upgrade and modification as a service in an illustrative embodiment. It is to be understood that this particular process is only an example, and additional or alternative processes can be carried out in other embodiments.

In this embodiment, the process includes steps 1900 through 1906. These steps are assumed to be performed by XuMaaS system 105 utilizing its modules 112, 114 and 116.

Step 1900 includes processing one or more modifiers, wherein each modifier includes an independent processing unit having a given canonical structure and is configured to execute one or more automated actions related to at least one of application modification and application migration. In at least one embodiment, processing one or more modifiers includes creating one or more new modifiers and/or searching a set of one or more existing modifiers. Such an embodiment can also include modifying at least one of the one or more existing modifiers using at least one user interface.

In one or more embodiments, the one or more automated actions include one or more automated security-related remediation actions in connection with one or more middleware products. Additionally or alternatively, the one or more automated actions can include one or more automated actions pertaining to messaging, one or more code fixes, one or more deployment pipelines, one or more cloud infrastructure services, and/or one or more API gateways.

Step 1902 includes obtaining data pertaining to multiple applications across multiple computing environments. Step 1904 includes determining, based at least in part on processing at least a portion of the obtained data, at least one of the one or more modifiers applicable for use in executing at least one of the one or more automated actions in connection with at least a portion of the multiple applications. In at least one embodiment, determining the at least one of the one or more modifiers applicable for use in executing at least one of the one or more automated actions includes determining a combination of two or more of the modifiers for concurrent use based at least in part on one or more action orchestration requirements. Additionally or alternatively, determining the at least one of the one or more modifiers applicable for use in executing at least one of the one or more automated actions can include determining a set of two or more of the modifiers for sequential use based at least in part on one or more action orchestration requirements.

Step 1906 includes executing the at least one of the one or more automated actions using the at least one determined modifier. Additionally, the techniques depicted in FIG. 19 can also include storing at least a portion of the one or more modifiers in at least one modifiable database and/or reusing the one or more modifiers based at least in part on the given canonical structure shared across the one or more modifiers.

Accordingly, the particular processing operations and other functionality described in conjunction with the flow diagram of FIG. 19 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to execute automated application modification and/or migration actions using at least one configurable modifier. These and other embodiments can effectively overcome problems associated with error-prone and resource-intensive application modification and/or migration efforts.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 20 and 21. Although described in the context of system 100, these platforms may also be used to implement at least portions of other information processing systems in other embodiments.

Figure 20:
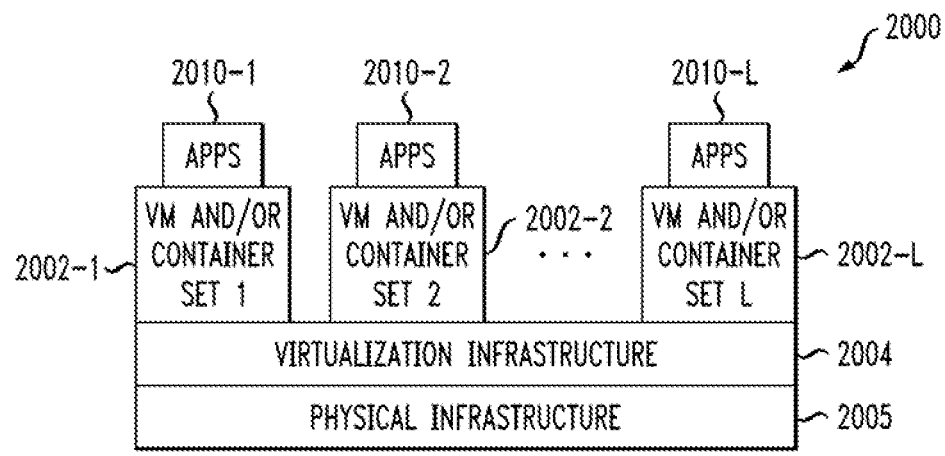
FIGS. 20 and 21 show examples of processing platforms that may be utilized to implement at least a portion of an information processing system in illustrative embodiments.
Figure 21:
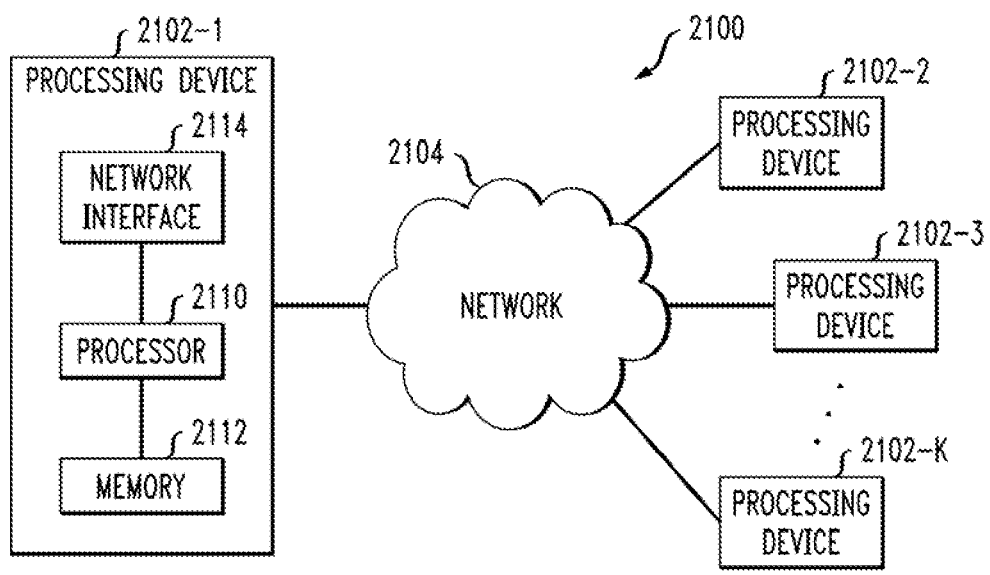

FIG. 20 shows an example processing platform comprising cloud infrastructure 2000. The cloud infrastructure 2000 comprises a combination of physical and virtual processing resources that are utilized to implement at least a portion of the information processing system 100. The cloud infrastructure 2000 comprises multiple VMs and/or container sets 2002-1, 2002-2, ... 2002-L implemented using virtualization infrastructure 2004. The virtualization infrastructure 2004 runs on physical infrastructure 2005, and illustratively comprises one or more hypervisors and/or operating system level virtualization infrastructure. The operating system level virtualization infrastructure illustratively comprises kernel control groups of a Linux operating system or other type of operating system.

The cloud infrastructure 2000 further comprises sets of applications 2010-1, 2010-2, ... 2010-L running on respective ones of the VMs/container sets 2002-1, 2002-2, ... 2002-L under the control of the virtualization infrastructure 2004. The VMs/container sets 2002 comprise respective VMs, respective sets of one or more containers, or respective sets of one or more containers running in VMs. In some implementations of the FIG. 20 embodiment, the VMs/container sets 2002 comprise respective VMs implemented using virtualization infrastructure 2004 that comprises at least one hypervisor.

A hypervisor platform may be used to implement a hypervisor within the virtualization infrastructure 2004, wherein the hypervisor platform has an associated virtual infrastructure management system. The underlying physical machines comprise one or more distributed processing platforms that include one or more storage systems.

In other implementations of the FIG. 20 embodiment, the VMs/container sets 2002 comprise respective containers implemented using virtualization infrastructure 2004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 2000 shown in FIG. 20 may represent at least a portion of one processing platform. Another example of such a processing platform is processing platform 2100 shown in FIG. 21.

The processing platform 2100 in this embodiment comprises a portion of system 100 and includes a plurality of processing devices, denoted 2102-1, 2102-2, 2102-3, ... 2102-K, which communicate with one another over a network 2104.

The network 2104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 2102-1 in the processing platform 2100 comprises a processor 2110 coupled to a memory 2112.

The processor 2110 comprises a microprocessor, a microcontroller, an application-specific integrated circuit (ASIC), a field-programmable gate array (FPGA) or other type of processing circuitry, as well as portions or combinations of such circuitry elements.

The memory 2112 comprises random access memory (RAM), read-only memory (ROM) or other types of memory, in any combination. The memory 2112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2102-1 is network interface circuitry 2114, which is used to interface the processing device with the network 2104 and other system components, and may comprise conventional transceivers.

The other processing devices 2102 of the processing platform 2100 are assumed to be configured in a manner similar to that shown for processing device 2102-1 in the figure.

Again, the particular processing platform 2100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
processing multiple modifiers, wherein each modifier comprises an independent processing unit having a given canonical structure, wherein at least a first of the multiple modifiers is configured to execute one or more automated actions related to application modification pertaining at least to application versioning, and wherein at least a second of the multiple modifiers is configured to execute one or more automated actions related to application migration;
obtaining data pertaining to multiple applications across multiple computing environments;
determining, based at least in part on processing at least a portion of the obtained data, at least a portion of the multiple modifiers applicable for use in connection with at least a portion of the multiple applications, wherein determining the at least a portion of the multiple modifiers comprises determining a combination of two or more of the modifiers for concurrent use, wherein the combination of two or more of the modifiers is determined based at least in part on satisfying one or more action orchestration requirements associated with the at least a portion of the multiple applications using the combination of two or more of the modifiers; and
executing one or more of at least one of the one or more automated actions related to application modification and at least one of the one or more automated actions related to application migration using the at least a portion of the multiple modifiers determined for use;
wherein the method is performed by at least one processing device comprising a processor coupled to a memory.

2. The computer-implemented method of claim 1, wherein determining the at least a portion of the multiple modifiers applicable for use in connection with at least a portion of the multiple applications comprises determining a set of two or more of the modifiers for sequential use based at least in part on one or more action orchestration requirements.

3. The computer-implemented method of claim 1, wherein processing the multiple modifiers comprises creating one or more new modifiers.

4. The computer-implemented method of claim 1, wherein processing the multiple modifiers comprises searching a set of one or more existing modifiers.

5. The computer-implemented method of claim 4, wherein processing the multiple modifiers comprises modifying at least one of the one or more existing modifiers using at least one user interface.

6. The computer-implemented method of claim 1, wherein the one or more of at least one of the one or more automated actions related to application modification and at least one of the one or more automated actions related to application migration comprise one or more automated security-related remediation actions in connection with one or more middleware products.

7. The computer-implemented method of claim 1, wherein the one or more of at least one of the one or more automated actions related to application modification and at least one of the one or more automated actions related to application migration comprise one or more automated actions pertaining to at least one of messaging, one or more code fixes, one or more deployment pipelines, one or more cloud infrastructure services, and one or more application programming interface gateways.

8. The computer-implemented method of claim 1, further comprising:
reusing the at least a portion of the multiple modifiers based at least in part on the given canonical structure shared across the multiple modifiers.

9. The computer-implemented method of claim 1, further comprising:
storing the at least a portion of the multiple modifiers in at least one modifiable database.

10. A non-transitory processor-readable storage medium having stored therein program code of one or more software programs, wherein the program code when executed by at least one processing device causes the at least one processing device:
to process multiple modifiers, wherein each modifier comprises an independent processing unit having a given canonical structure, wherein at least a first of the multiple modifiers is configured to execute one or more automated actions related to application modification pertaining at least to application versioning, and wherein at least a second of the multiple modifiers is configured to execute one or more automated actions related to application migration;

to obtain data pertaining to multiple applications across multiple computing environments;

to determine, based at least in part on processing at least a portion of the obtained data, at least a portion of the multiple modifiers applicable for use in connection with at least a portion of the multiple applications, wherein determining the at least a portion of the multiple modifiers comprises determining a combination of two or more of the modifiers for concurrent use, wherein the combination of two or more of the modifiers is determined based at least in part on satisfying one or more action orchestration requirements associated with the at least a portion of the multiple applications using the combination of two or more of the modifiers; and to execute one or more of at least one of the one or more automated actions related to application modification and at least one of the one or more automated actions related to application migration using the at least a portion of the multiple modifiers determined for use.

11. The non-transitory processor-readable storage medium of claim 10, wherein determining the at least a portion of the multiple modifiers applicable for use in connection with at least a portion of the multiple applications comprises determining a set of two or more of the modifiers for sequential use based at least in part on one or more action orchestration requirements.

12. The non-transitory processor-readable storage medium of claim 10, wherein processing the multiple modifiers comprises creating one or more new modifiers.

13. The non-transitory processor-readable storage medium of claim 10, wherein processing the multiple modifiers comprises searching a set of one or more existing modifiers and modifying at least one of the one or more existing modifiers using at least one user interface.

14. An apparatus comprising:
at least one processing device comprising a processor coupled to a memory;
the at least one processing device being configured:
to process multiple modifiers, wherein each modifier comprises an independent processing unit having a given canonical structure, wherein at least a first of the multiple modifiers is configured to execute one or more automated actions related to application modification pertaining at least to application versioning, and wherein at least a second of the multiple modifiers is configured to execute one or more automated actions related to application migration;
to obtain data pertaining to multiple applications across multiple computing environments;
to determine, based at least in part on processing at least a portion of the obtained data, at least a portion of the multiple modifiers applicable for use in connection with at least a portion of the multiple applications, wherein determining the at least a portion of the multiple modifiers comprises determining a combination of two or more of the modifiers for concurrent use, wherein the combination of two or more of the modifiers is determined based at least in part on satisfying one or more action orchestration requirements associated with the at least a portion of the multiple applications using the combination of two or more of the modifiers; and to execute one or more of at least one of the one or more automated actions related to application modification and at least one of the one or more automated actions related to application migration using the at least a portion of the multiple modifiers determined for use.

15. The apparatus of claim 14, wherein determining the at least a portion of the multiple modifiers applicable for use in connection with at least a portion of the multiple applications comprises determining a set of two or more of the modifiers for sequential use based at least in part on one or more action orchestration requirements.

16. The apparatus of claim 14, wherein processing the multiple modifiers comprises creating one or more new modifiers.

17. The apparatus of claim 14, wherein processing the multiple modifiers comprises searching a set of one or more existing modifiers and modifying at least one of the one or more existing modifiers using at least one user interface.

18. The apparatus of claim 14, wherein the one or more of at least one of the one or more automated actions related to application modification and at least one of the one or more automated actions related to application migration comprise one or more automated security-related remediation actions in connection with one or more middleware products.

19. The apparatus of claim 14, wherein the one or more of at least one of the one or more automated actions related to application modification and at least one of the one or more automated actions related to application migration comprise one or more automated actions pertaining to at least one of messaging, one or more code fixes, one or more deployment pipelines, one or more cloud infrastructure services, and one or more application programming interface gateways.

20. The apparatus of claim 14, wherein the at least one processing device is further configured:
to reuse the at least a portion of the multiple modifiers based at least in part on the given canonical structure shared across the multiple modifiers.

* * * * *